United States Patent [19]
Pettesch

[11] Patent Number: 5,660,214
[45] Date of Patent: Aug. 26, 1997

[54] OVERFILL PREVENTION FOR LIQUID STORAGE TANKS

[75] Inventor: Martin C. Pettesch, Cranford, N.J.

[73] Assignee: Universal Valve Co., Inc., Elizabeth, N.J.

[21] Appl. No.: 541,369

[22] Filed: Oct. 10, 1995

[51] Int. Cl.$^6$ ............................................. F16K 21/00
[52] U.S. Cl. .................... 141/198; 141/213; 141/216; 137/434; 137/437; 137/443
[58] Field of Search ........................... 141/198, 212, 141/213, 216; 137/434, 436, 437, 442, 443, 448; 251/279, 280

[56] References Cited

U.S. PATENT DOCUMENTS

| | | | |
|---|---|---|---|
| 2,355,017 | 8/1944 | Stone | 251/96 |
| 3,385,562 | 5/1968 | Newell | 251/298 |
| 3,779,511 | 12/1973 | Wenglar | 251/306 |
| 4,313,459 | 2/1982 | Mylander | 141/198 X |
| 4,483,367 | 11/1984 | Ross, Jr. et al. | 141/198 X |
| 4,667,711 | 5/1987 | Draft | 141/198 |
| 4,986,320 | 1/1991 | Kesterman et al. | 141/198 |
| 4,998,571 | 3/1991 | Blue et al. | 141/198 |
| 5,027,870 | 7/1991 | Butterfield | 141/198 |
| 5,152,315 | 10/1992 | Lagache | 137/448 |
| 5,163,470 | 11/1992 | Maeshiba | 137/448 |
| 5,174,345 | 12/1992 | Kesterman et al. | 141/198 |
| 5,207,241 | 5/1993 | Babb | 137/447 |
| 5,235,999 | 8/1993 | Lindquist et al. | 141/198 X |
| 5,241,983 | 9/1993 | Lagache | 137/448 |
| 5,522,415 | 6/1996 | Hopenfeld | 141/198 X |

FOREIGN PATENT DOCUMENTS

| | | | |
|---|---|---|---|
| 1175074 | 3/1959 | France | 251/308 |
| 787140 | 12/1957 | United Kingdom | 251/308 |

*Primary Examiner*—J. Casimer Jacyna
*Attorney, Agent, or Firm*—Edward Dreyfus, Esq.

[57] ABSTRACT

A liquid storage tank overfill prevention assembly that includes an outer housing, an insert that includes fill flow ports, a shut-off sleeve to slowly close off the flow ports and a float member for controlling the sleeve in response to the rise of the stored liquid level. As the product flows through the assembly it is diverted through flow ports in the insert to the inside of the outer body and through the fill pipe installed in the bottom of the valve. As the product level in the tank increases, the float rises and the shut-off sleeve relatively slowly covers or closes the flow ports in the insert. The shut-off is gradual and no hydraulic shock is felt through the valve. For further benefit, the shape of the shut-off sleeve diverts the liquid flow steam through the ports and is shaped to maintain substantial laminar liquid flow until the liquid exits the ports into the housing interior. Thus, resistance or decrease in the liquid flow rate is minimized notwithstanding this diversion and maximum flow rates can be achieved when the ports are fully open for the rapid filling of the tank.

10 Claims, 4 Drawing Sheets

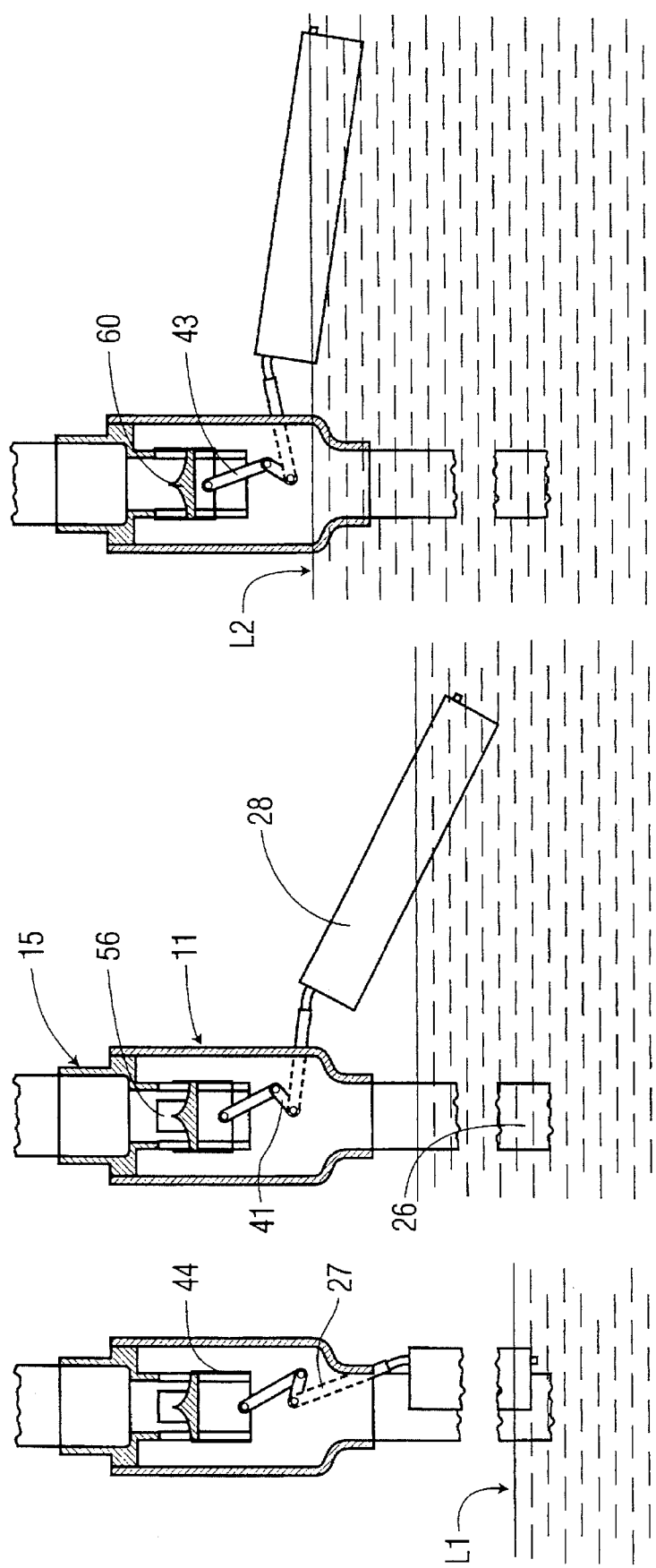

OVERFILL PREVENTION FOR LIQUID STORAGE TANKS

BACKGROUND

The present invention relates to overfill prevention assemblies for storage tanks and more particularly to such assemblies for above ground storage tanks.

Above ground liquid storage tanks for fuel, oil, chemicals, and other liquids conventionally include a containment apparatus located at the tank top to enable access and external hose connection to a fill adaptor. A vertical fill pipe extends downward with its lower end spaced above the tank interior bottom to deliver liquid at that location. A liquid level sensing shut-off valve assembly positioned inside the tank couples the fill adaptor to the top of the fill pipe.

Functions attempted to be performed by conventional shut-off valve assemblies include cutting of the delivery flow when the storage tank is nearly full and bleeding into the tank the fuel remaining in the adaptor and delivery hose after the delivery truck operator closes the valves on the truck. To accomplish this, a float member located outside the assembly rises as the liquid level approaches the top of the chamber. When the float reaches a predetermined upward position, the float causes a shut-off valve to enter the path of the delivery fuel stream. The force of the stream closes the shut-off valve against a valve seat thus sealing closed the main delivery opening in the assembly. Additional valves and ports may be provided to bleed the fuel remaining in or thereafter entering the fill adaptor either into the storage tank chamber or through a bypass channel to the lower part of the fill pipe.

Many problems arise from the presence of these shut-off valve sections in above ground tanks. For example, the valves and their many associated moving springs, cams, and pins break or become defective or worn due to the repeated slamming of the valve.

These problems could lead to the valve remaining in its closed position even when the float falls to its lowest position. In this case, the shut-off assembly must be pulled from the tank for repair.

SUMMARY OF EXEMPLARY EMBODIMENT OF PRESENT INVENTION

An overfill prevention assembly according to the principles of the present invention avoids the aforementioned problems, and provides other and further advantages over prior art shut-off valve sections.

In one exemplary embodiment, the overfill prevention assembly includes an outer housing, an insert that includes fill flow ports, a shut-off sleeve to slowly close off the flow ports and a float member for controlling the sleeve in response to the rise of the stored liquid level. As the product flows through the valve it is diverted through flow ports in the insert to the inside of the outer body and through the fill pipe installed in the bottom of the valve. As the product level in the tank increases, the float rises and the shut-off sleeve relatively slowly covers or closes the flow ports in the insert. The shut-off is gradual and no hydraulic shock is felt through the valve.

For further benefit, the shape of the shut-off sleeve diverts the liquid flow steam through the ports and is shaped to maintain substantial laminar liquid flow until the liquid exits the ports into the housing interior. Thus, resistance or decrease in the liquid flow rate is minimized notwithstanding this diversion and maximum flow rates can be achieved when the ports are fully open for the rapid filling of the tank.

A drop tube according to the principles of the present invention has relatively few moving parts, has no springs, cams or check valves of any type, is much more reliable and rugged, and does not produce hammering or shock to the assembled parts.

Other and further objects and advantages afforded by the present invention will become apparent with the following detailed description of an exemplary embodiment when taken in view of the appended drawings, in which:

DRAWINGS

FIGS. 4 and 5 are a partial side section view of the FIG. 2 assembly with tank liquid at or below level $L_1$, of FIG. 1.

FIG. 6 is the same as FIG. 5 with tank liquid at a level intermediate to levels $L_1$ and $L_2$.

FIG. 7 is the same as FIG. 5 with tank liquid at level $L_2$.

DETAILED DESCRIPTION OF EXEMPLARY EMBODIMENT

Figure 1:
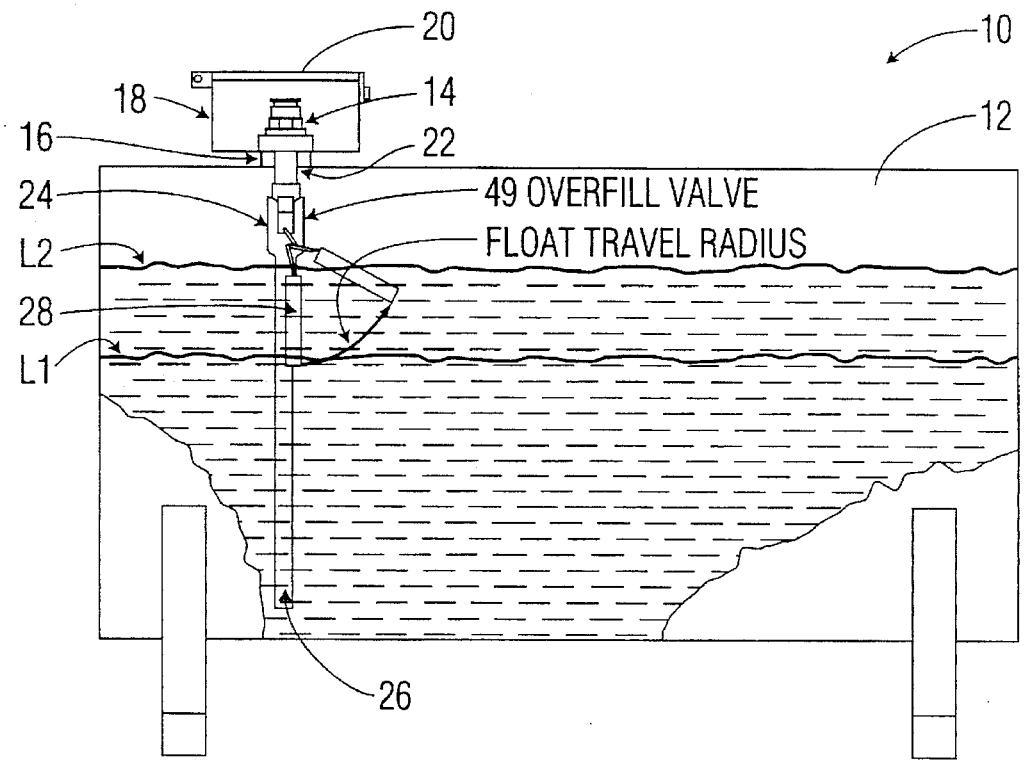
FIG. 1 is a diagrammatic side section view of an above ground liquid storage tank with one exemplary embodiment of an overfill prevention assembly according to the present invention is installed.
Figure 2:
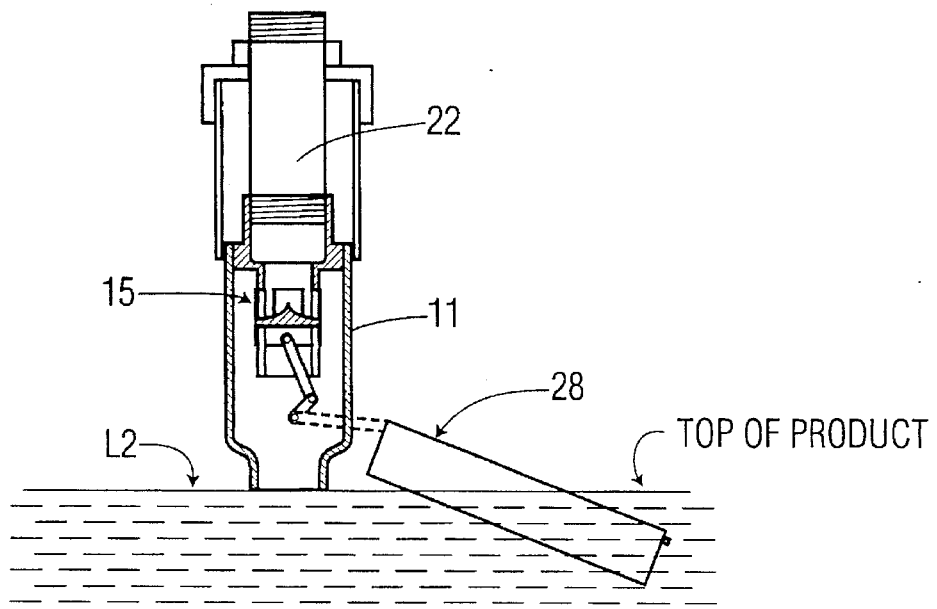
FIG. 2 is a diagrammatic side section view of the overfill prevention assembly of FIG. 1 in the shut-off position.

With reference to FIGS. 1–7, above ground liquid storage tank 10 is supported above ground level and comprises an internal storage chamber 12, a fill adaptor assembly 14 supported on the top of tank 10 by a pipe nipple 16. A containment manhole 18 mounts on nipple 16 and includes a cap or top 20 hinged to enable access for a fill hose coupler (not shown) to be threaded to adaptor assembly 14.

A smaller pipe nipple 22 is threaded into adaptor assembly 14 and extends downward into chamber 12. Overfill prevention assembly 24, further described below, includes an upstream end preferably threaded to nipple 22 and a downstream end preferably threaded to a vertical fill pipe 26 that extends through a major portion of the height of chamber 12 so that fill liquid enters near the bottom of chamber 12.

Overfill prevention assembly 24 includes an outer housing 11 and a flow restriction and shut-off section 15 located within housing 11 as further described below. Section 15 is controlled by a tank liquid level float assembly 28 that rotates from the vertical position or fully open position shown in FIG. 1 whenever the tank liquid rises above $L_1$ toward a fully closed position achieved when tank liquid rises to $L_2$. Float assembly 28 is coupled through linkages 29 to control the degree of restriction or closure of section 15 in response to and in relation to the tank liquid level rise and fall, $L_1$ being fully open and $L_2$ being fully closed.

Figure 3:
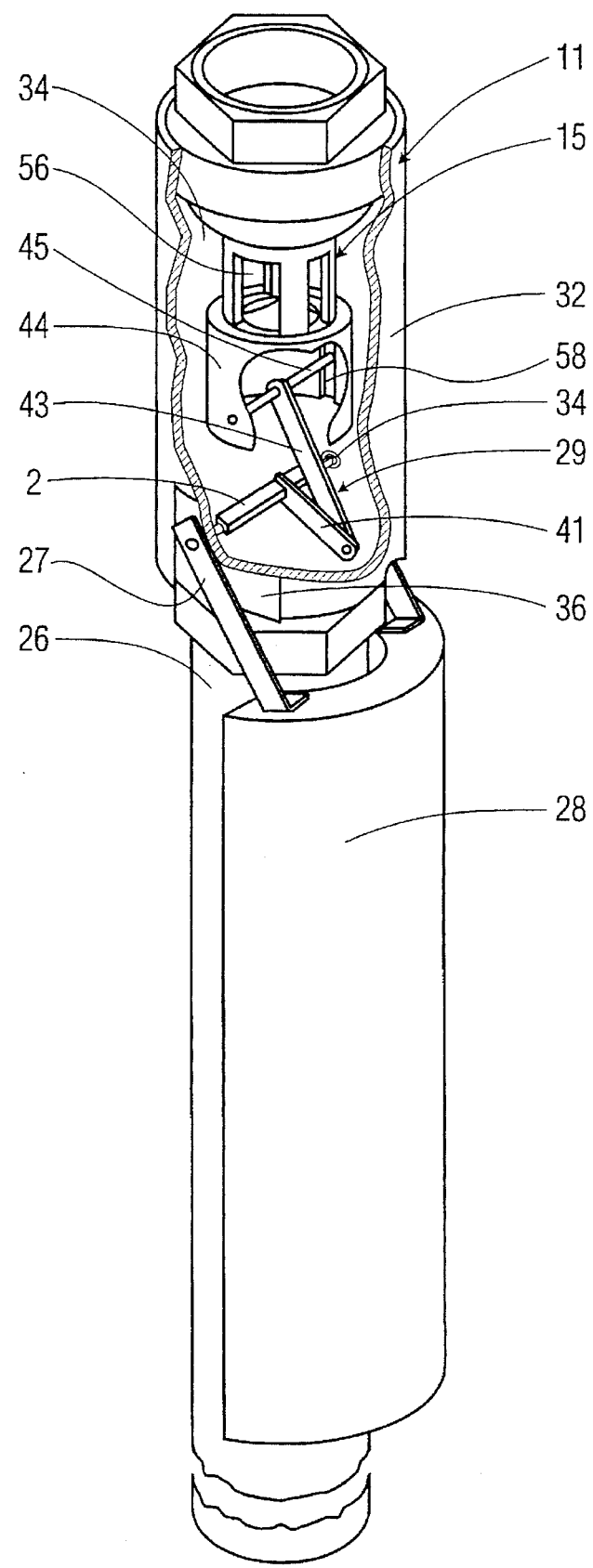
FIG. 3 is a perspective of the overfill prevention assembly and drop tube with parts of the outer housing broken away.
Figure 4:
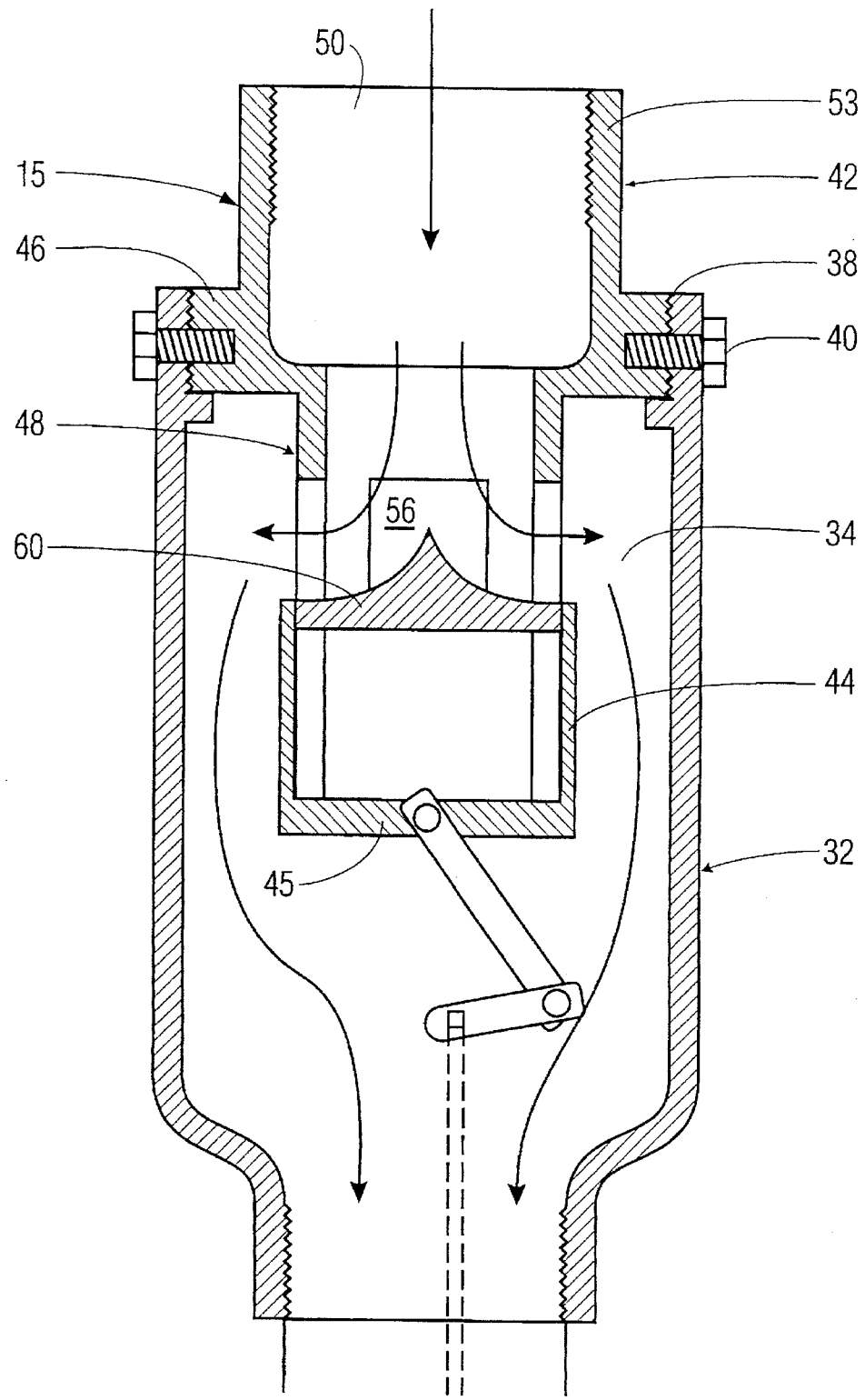

With reference to FIG. 3, housing 11 includes a vertical housing or pipe 32 defining an internal flow chamber 34. The downstream end of housing 32 comprises a smaller outside diameter and, in one example, is internally threaded to mate with the top threads of vertical fill pipe 26. Housing 32 includes float assembly mount openings 34 and cutaways 36 to mount for rotation on either side of housing 32 the inwardly facing mounting fingers 27 of float assembly 28. The upstream end of housing 32 includes internal threads 38 to mate with those of an insert 15, described below. If desired, the insert 15 may be alternatively or also bolted to housing 32 with the provision of tapped bolt holes and external bolts 40.

With reference to FIGS. 3–7, section 15 includes a flow restriction insert 42 and sleeve 44. The upstream end of insert 42 includes a pipe section 53 internally threaded to mate with pipe nipple 22, a mid-region 46 externally threaded to mate with housing threads 32 and lower section 48 for directing fill liquid flow and guiding the valve sleeve as described below. Insert 42 defines internal chambers that communicate with adapter 14 and the chamber 34 of housing 11. Insert 42 further defines a number, preferably four, of ports or windows 56 in the side walls thereof providing communication between the insert 15 and the chamber 34 of housing 32. The lower portion of insert 15 comprises vertical guide slots 58 that extend below ports 56, functioning to guide the sleeve 44 cross member described below.

Insert 15 preferably comprises a flow diverter 60 (FIG. 4), preferably, conically shaped with its apex and axis aligned along the axis of the insert lower section 48. Diverter 60 serves to divert the fill liquid flow from axially downward through the insert, to laterally through ports 56 and into chamber 34 of housing 11. The combined areas of ports 56 should be equal to or be greater than the internal cross area of lower section 48 to avoid restricting the maximum fill velocity of the liquid. The conical shape of the diverter 60 functions to change the direction of liquid flow yet tends to maintain laminar flow until the liquid exits into chamber 34.

Insert 15 further includes a cylindrically shaped sleeve 44 having a cross member 45 extending across its bottom end and dimensioned to fit about lower section 48. Cross member 45 rides vertically in guide slots 58. Sleeve 44 assumes the position shown in FIG. 4 when the float assembly 28 is in the full open position and rises to gradually close off ports 56 to restrict liquid flow from chamber 52 to chamber 34. Thus, the height of sleeve 44 should be sufficient to close fully windows or ports 56 when the tank level reaches L2.

Float assembly 28 comprises a pair of arms or fingers 27 that are secured to a control rod 2 that seats for rotation in mounting openings 34 in housing 11. Fingers 27 would be secured to rod 2 by E-clips or other suitable means. The outer ends of rod 2 are round but the mid-portion is square in cross section. Round openings 35 are aligned transverse the housing axis and receive rod 37 preferably square in cross section. Thus, each end of rod 2 is connected fast to opposite ears finger 27 so that rotation of the finger cause like rotation of rod 2. Linkages 29 include one end 41 mounted on rod 2 and the opposite end 43 pivoted to cross member 45. Accordingly, the rotation of the float 28 rotates rod 2 which in turn extends or retracts linkage 29, which in turn drives or withdraws sleeve 44 vertically to close or open ports 56. Note in FIGS. 5–7 the movement of parts is gradual, reliable, without shock or hammering and the degree of restriction of ports 56 by sleeve 44 is in relation to and under control of the liquid tank liquid level at or between L1 and L2. As the stored level approaches L2, the feed liquid is gradually shut off The fill operator then knows that the tank is full, except for the required air pocket at the interior top, and disconnects the fill hoses. Insert 15 can be provided with a standard bleed opening (not shown) above the flow ports so that standing liquid above ports 44 can bleed into chamber 34 when the ports are dosed and the flow stops.

It will be understood that overfill protection apparatus according to the present invention has application with below ground as well as above ground liquid storage tanks particularly when used in combination with automatic or electronic tank liquid level gauges or indicating apparatus, no dip stick need be used.

It will also be understood that various modifications and changes can be made to the herein disclosed exemplary embodiment without departing from the spirit and scope of the present invention.

I claim:

1. An assembly for filling a liquid storage tank having an interior chamber comprising:

a feed pipe for delivering fill liquid to the top portion of the interior chamber, a fill pipe for delivering fill liquid to the bottom of the interior chamber, an overfill prevention assembly for delivering fill liquid from said feed pipe to said fill pipe and comprising an outer housing having a bottom releasably connected to the top of said fill pipe and defining a first chamber coupled to deliver fill liquid to said fill pipe, an insert assembly having a top releasably connected to the bottom of said feed pipe and defining a second chamber coupled to receive fill liquid from said feed pipe, a section defining at least one port for delivering to said first chamber fill liquid that passes through said second chamber, and control apparatus for restricting the effective flow area of said at least one port in relation to the height of the liquid stored in the tank interior chamber when between predetermined first and second liquid levels, said control apparatus comprising a float assembly for controlling the effective flow area of said at least one port in response to the level of the stored liquid between predetermined first and second levels, and said float assembly comprising a control rod rotatably mounted to said housing, a float member external said housing coupled to rotate said control rod in relation to predetermined heights of stored liquid levels.

2. The assembly according to claim 1, wherein said control apparatus comprises a sleeve member for controlling the volume of liquid flow through said at least one port, said port defining a window arranged generally parallel to the liquid flow path in said second chamber and said sleeve being coupled to move generally parallel to said window to control the amount of liquid flow through said window, said insert comprising a diverter for diverting the liquid flowing through said second chamber through said window and into said first chamber and said diverter being shaped to maintain generally laminar flow for the diverted liquid until it exits the window.

3. The assembly according to claim 2, wherein said float assembly comprises a linkage assembly coupled to said control rod and sleeve member for moving said sleeve member in response to rotation of said control rod.

4. The assembly according to claim 3, wherein said housing and insert are axially aligned and a major portion of said insert and a major portion of said second chamber are located within said housing.

5. The assembly according to claim 4, wherein said feed pipe, housing and fill pipe are axially aligned.

6. The assembly according to claim 4, wherein said insert is located near the upper portion of said housing and comprises at least two horizontally spaced windows and a guide section located below said windows for guiding said sleeve member, said sleeve member being dimensioned to control the liquid flow through all of said at least two windows.

7. The assembly according to claim 6, wherein said control rod is supported by said housing at a location below said guide section and at a location above said float member when the latter is in its lowermost position.

8. The assembly according to claim 6, wherein the combined open area of said at least two windows is at least equal to the smallest cross section area of said second chamber.

9. The assembly according to claim 6, wherein said insert, second chamber, and windows are cylindrically arranged and said sleeve member is cylindrical and slidable axially to control the effective openings of said windows.

10. The assembly according to claim 2, wherein control apparatus slowly restricts the volume of liquid flow through said at least one port through continuous movement of said sleeve member in response to the continuous movement of stored liquid between the predetermined first and second liquid levels.

* * * * *